United States Patent Office 3,836,605
Patented Sept. 17, 1974

3,836,605
POLYCONDENSATES OF DIAMIDES, N,N'-UREAS AND FORMALDEHYDE ADMIXED WITH OXYMETHYLENE POLYMERS
Ernst Ricker, Frankenthal, Pfalz, Bruno Sander, Ludwigshafen (Rhine), Franz Schmidt and Erich Schwartz, Mannheim, and Heinrich Sperber and Hans Wilhelm, Ludwigshafen (Rhine), Germany, assignors to Badische Anilin- & Soda-Fabrik Aktiengesellschaft, Ludwigshafen (Rhine), Germany
No Drawing. Original application Apr. 19, 1968, Ser. No. 722,564, now abandoned. Divided and this application Mar. 8, 1973, Ser. No. 339,159
Claims priority, application Germany, Apr. 21, 1967,
B 92,175, B 92,178
Int. Cl. C08g *37/32, 51/58*
U.S. Cl. 260—849
5 Claims

ABSTRACT OF THE DISCLOSURE

A process for the production of polycondensates by polycondensing in aqueous acid medium (A) diamides of dicarboxylic acids having at least four carbon atoms, (B) N,N'-substituted ureas and (C) formaldehyde, products obtained in this way and a stabilized moldable admixture of said polycondensates with oxymethylene polymers.

---

This is a division of application Ser. No. 722,564, filed Apr. 19, 1968, now abandoned.

This invention relates to the production of polycondensates of diamides and formaldehyde (or the N-methylol compounds of diamides) and products obtained in this way.

It is known that diamides such as diamides of dicarboxylic acids, urea or urea derivatives having two NH groups can be condensed with formaldehyde without additions. Whereas urea and the said urea derivatives react readily with formaldehyde to form the corresponding N-methylol compounds and polycondensates, carboxylic diamides behave differently so that it has hitherto not been possible to predict their behavior in polycondensation. Thus for example isophthalamide cannot be polycondensed in the usual way with formaldehyde (cf. Houben-Weyl, "Methoden der Organischen Chemie," 4th edition, Stuttgart, 1963, volume 14/2, pages 371/372).

Although condensates of N,N'-dimethylolisophthalamide and a diamide or urea are known from German Patent Specification No. 1,173,245, the polycondensation takes place under drastic reaction conditions by melting the components together and heating the melt to a temperature of up to more than 200° C.

It is an object of this invention to provide a new type of polycondensates of the said kind which can be prepared under mild conditions and with a controllable degree of polycondensation and which are particularly suitable as additives to polymers owing to the ease with which they can be incorporated and owing to their good compatibility. It is another object of this invention to provide an improved moldable composition comprising polycondensates of the said kind and oxymethylene polymers having a high thermal stability and particularly good molding properties.

We have now found that surprisingly diamides of dicarboxylic acids having four to eighteen carbon atoms, particularly isophthalamide, can be polycondensed with N,N'-disubstituted ureas and formaldehyde in an acid aqueous medium to give nitrogenous products having particularly advantageous properties.

In accordance with this invention therefore a process for the production of nitrogenous polycondensates by polycondensation of diamides with formaldehyde, if desired in the form of N-methylol compounds of the diamides, comprises polycondensing:

(A) a diamide of a dicarboxylic acid having four to eighteen carbon atoms; and
(B) a N,N'-alkylenurea having three to ten carbon atoms and/or a N,N'-disubstituted urea having an alkyl, aryl and/or aralkyl radical having one to eight carbon atoms as substituents; with
(C) formaldehyde;

in an aqueous acid medium at from 50° to 100° C. using 1 to 2 moles of formaldehyde per mole of the components (A) and (B).

The resultant aqueous polycondensates are preferably made neutral or weakly alkaline and recovered in a powdered condition by spraydrying, if desired after a solvent has been added.

Examples of suitable diamides of dicarboxylic acids having four to eighteen and particularly five to twelve carbon atoms (component A) are azelaic diamide, sebacic diamide, decanedicarboxylic diamide or N,N'-dimethylsuberic diamide; adipamide and particularly isophthalamide are very suitable.

N,N'-alkylenureas having three to ten carbon atoms which are preferably used as component (B) are particularly N,N'-ethylenurea and N,N'-propylenurea and mixtures of the same. Suitable N,N'-disubstituted ureas having alkyl, aryl and/or aralkyl radicals having one to eight carbon atoms, particularly hydrocarbon radicals, as substituents are particularly N,N'-dialkylureas, such as N,N'-dimethylurea, N,N'-diethylurea and N,N'-dibutylurea, N,N'-diarylureas and N,N'-aralkylureas, such as N,N'-diphenylurea and N,N'-ditolylurea, and N-alkyl-N'-arylureas, such as N-methyl-N'-tolylurea. The molar ratio of component (A) to component (B) is advantageously from 0.7:1 to 1.3:1.

Instead of using formaldehyde (which is preferably used in aqueous solution) as component (C), conventional substances yielding formaldehyde, such as paraformaldehyde, trioxane or polyoxymethylene, may be used in appropriate amounts. Obviously it is also possible to use the formaldehyde for the polycondensation in the form of N-methylol compounds of the component (A) and/or (B) prepared in a preliminary stage, although these equivalent embodiments of the process for the production of the polycondensates do not in general afford any particular advantage.

The amount of formaldehyde (in free or combined form) used in the condensation should be chosen so that there are about 1 mole to 2 moles of formaldehyde per 1 mole of the components (A) and (B), i.e. so that one to two molecules of formaldehyde are available for every two amide groups in the components (A) and (B). The properties of the resultant polycondensates can be influenced in the desired way of varying the amount of formaldehyde. When about 1 mole of formaldehyde is used for each mole of the sum of components (A) and (B), condensates are obtained which undergo further condensation only slowly and to a limited extent when melted. These condensates may be kept in molten condition for several hours and are then still soluble. They are very suitable for mixing with or stabilizing other plastics, particularly thermoplastics, as will be explained in detail below. The molar ratio of component (A) to component (B) in this case is advantageously 0.7:1 to 1.3:1 and the molar ratio of (C) to the sum of components (A) and (B) is 1:1 to 1.5:1. In the preferred embodiment, 1 mole of isophthalamide or adipamide and about 1 mole of N,N'-ethylenurea or N,N'-propylenurea are polycondensed with about 2 to 2.5 moles of formaldehyde, i.e. 1 to 1.25 moles of formaldehyde per mole of the sum of components (A) and (B). When larger amounts of formaldehyde, for example 1.25 to about 2 moles of formaldehyde per mole of the sum of components (A) and (B), are used, further condensation takes place more or less rapidly upon heating or melting the condensates formed with the formation of insoluble and high melting point products. These products are particularly suitable as additives to baking finishes.

Suitable acid polycondensation catalysts in the process according to this invention are those conventionally used in aminoplast chemistry and in the conventional amounts, particularly mineral acids such as sulfuric acid or phosphoric acid, and strongly acid ion exchangers. Sulfuric acid is preferred in amounts of from about 0.05 to 0.5% of the weight of components (A) and (B).

Polycondensation in aqueous medium may take place at about 50° to 100° C., particularly 80° to 100° C., and is generally over after about one to three hours. The resultant polycondensate is advantageously neutralized by adding alkali. It has proved to be advantageous to separate the polycondensate, which often occurs as a separate viscous layer containing water, from the aqueous layer, to adjust it to a pH value of 7 to 8 with aqueous alkali solution and to wash it. When the viscous layer has a relatively high viscosity it is advantageous to add an organic solvent which is miscible with water, such as 1,3-dioxolane, methanol or ethylene glycol monomethyl ether. The polycondensate may be used immediately in the form of such solutions for various purposes.

Isolation of the polycondensates in powdered form from aqueous solutions which may contain organic solvents, may be carried out by conventional methods. The polycondensates are preferably isolated by spray-drying the solutions in a heated stream of inert gas; they are obtained in the form of a fine powder which is practically free from uncombined formaldehyde and water.

Polycondensates prepared according to this invention have in general K values of from about 15 to 20 determined according to the method of H. Fikentscher, Cellulose-Chemie, 13 (1932), pages 58 to 64, measured in a 1% solution in N-methylpyrrolidone at 25° C. They are suitable for mixing with other plastics, for special gluing, for coating compositions and as constituents of baking enamels.

Their advantage over polycondensates prepared by melt condensation according to the German Patent Specification No. 1,173,245 is that their manufacture is simpler. Moreover they have melting points which are about 20° to 50° C. lower so that they are more easily processed for some purposes.

In contrast to prior art aminoplasts, they have outstanding miscibility and compatibility with other polymers, including prior art lacquer binders based on acrylic resins and epoxide resins. Polycondensates prepared with the smaller amounts of formaldehyde moreover have the advantage that in spite of production similar to that of aminoplasts they can be melted together with other plastics for long periods without forthwith becoming insoluble or infusible.

Polycondensates according to the invention are particularly suitable for stabilizing moldable macromolecular polyacetals, in particular polyoxymethylenes consisting to the extent of at least 80 mol percent of its units and preferably of at least 80% by weight of recurring oxymethylene units in the main chain of the molecule against the action of heat. Prior art polyacetals of this type are the macromolecular polymers of formaldehyde and trioxane, particularly those whose terminal hydroxyl groups have been stabilized by chemical reaction, for example by etherification or esterification, and copolymers of trioxane with compounds which introduce oxyalkylene units having at least two adjacent carbon atoms into the polymer chain, for example with cyclic acetals or ethers which have at least two adjacent carbon atoms in the molecule, such as ethylene oxide, propylene oxide, 1,3-dioxolane, 1,3-dioxane, 1,3-doxacycloheptane or diglycol formal, or with linear polyacetals having repeating acetal groupings in the main chain of the molecule, in particular polyformals, such as polydioxolane or polybutanediol formal. Preferred oxymethylene copolymers have at least one chain containing 80 to 99.6 mol percent recurring oxymethylene ($—OCH_2$) units interspersed with —OR— groups in the main polymer chain where R is a divalent radical containing at least two carbon atoms and preferably 2 to 4 carbon atoms directly linked to each other and portioned in the chain between the two valances with any substituents on the R radical being inert.

It is already known that polyacetals can be stabilized against degradation when heated, such as occurs for example in processing the polyacetals in conventional processing equipment for thermoplasts. by adding to them amides, urea or urea derivatives. It is known from German Patent Specification No. 1,173,245 of the applicant that condensates prepared by malting together (A) a hydroxymethylated dicarboxylic diamide and (B) a carboxylic amide having two —CO—NH— groups in the molecule or urea or a urea derivative are stabilizers for marcomolecular polyformaldehyde against degradation and discoloration by heat. The said polycondensates are however not satisfactory in all respects. Thus the melting range which in some cases is above 200° C. is a disadvantage when they are to be incorporated into trioxane copolymers which melt about 10° to 15° C. lower than acetylated formaldehyde homopolymer and it is desired to make full use of the possibility of lowering the processing temperature. Moreover the polycondensates cannot always be incorporated satisfactorily.

The polycondensates according to this invention have a lower melting point and can be better incorporated into polyacetals than the said polycondensates but have at least equally favorable stabilizer properties as the said polycondensates, thus offering a surprising combination of advantageous properties.

The polycondensates are added to the macromolecular polyacetals in the conventional way in stabilizing amounts, e.g. from 0.05 to 5%, preferably from 0.1 to 2%, by weight with reference to the weight of the polyacetals. Owing to the good stabilizing effect, an addition of 0.1 to 0.6% by weight is in general adequate.

It is of particular advantage to add to the polyacetals stabilized according to the invention an addition stabilizing amount, in particular 0.01 to 2%, preferably 0.1 to 0.5%, by weight of conventional antioxidants. Phenolic antioxidants, such as an alkylene bisphenol having 1 to 4 carbon atoms in the alkylene group and having from 0 to 2 alkyl substituents on each benzene ring, each alkyl substituent having from 1 to 4 carbon atoms, for example 2,2'-methylene-bis-(4-ethyl-6-tertiary - butylphenol), 2,6-ditertiary-butyl-p-cresol, 2,2'-methylene-bis - (4 - methyl-6-tertiary-butylphenol) or 2,2'-butylidene-bis-(4 - methyl-6-tertiary-butylphenol) are preferred; hydrazones, such as benzaldehyde-($\alpha$-N-methyl)-phenylhydrazone, piperonal-($\alpha$-N-methyl)-phenylhydrazone, 3,5-ditertiary - butyl - 4-hydroxybenzaldehyde-($\alpha$-N - methyl) - phenylhydrazone and mixtures of the said compounds are also very suitable.

For purposes where the color of the polyacetal molding material is not important, secondary aromatic amines, such as phenyl-$\beta$-naphthylamine and diphenylamine, may also be used.

Polycondensates used according to this invention have good miscibility with the polyacetals. They may be incorporated in conventional dry mixers, if desired together with pigments, fillers and the like, into powdered polyacetals or may be easily incorporated in solid or dissolved condition into molten polyacetals. In the case of trioxane copolymers. the stabilizers may be added to the powdered or granulated copolymer after removal of unstable constituents, which may be carried out for example by hydrolytic or thermal degradation, and incorporated by fusing and homogenising.

In the copolymerization of trioxane however it is advantageous to add the stabilizer before, during or after the melting of the polyacetal in the processing and degassing of the copolymer. The addition of a polycondensate which has been made slightly alkaline by adding small amounts of alkali has proved advantageous in this case, and the alkali (usually added in an amount of 0.01 to 1%, preferably 0.2 to 0.5%, by weight with reference to the polycondensate) which has not been neutralized serves to inactivate the radicals of cationic catalyst, for example boron trifluoride, still present in the polyacetals or trioxane copolymers. The aqueous polycondensate is advantageously brought to a pH value of about 7.5 to 9 by adding sodium hydroxide, potassium hydroxide, sodium carbonate or alkaline substances having a similar effect, and thereafter isolated by spray-drying if desired.

Polyacetals which have been stabilized according to this invention for example with polycondensates of isophthalamide, N,N'-ethyleneurea or N,N'-propyleneurea and formaldehyde may be repeatedly processed from the melt without becoming discolored.

The invention is further illustrated by the following Examples. The parts and percentages specified in the Examples are by weight unless otherwise indicated. Parts by volume bear the same relation to parts by weight as the liter to the kilogram. The K values given have been determined by the method of H. Fikentscher, Cellulose-Chemie, *13* (1932), pages 58 to 64.

EXAMPLE 1

573 parts of N,N'-ethylenurea (90%) (component B) and 984 parts of isophthalamide (component A) are added with continuous stirring to a mixture of 1200 parts of 30% aqueous formaldehyde (component C), 150 parts of water and 30 parts of 10% aqueous sulfuric acid. The whole is then heated to 90° to 95° C. while stirring and condensed for ninety minutes under slight reflux so that two liquid layers form.

After the whole has been cooled, the upper layer is siphoned off and discarded. The lower layer of polycondensate (I) is stirred with water and the upper aqueous layer which again forms is also siphoned off. The remainder is adjusted to a pH value of 7 with dilute caustic soda solution. The layer with the polycondensate (I) contains about 67% of solids and has a viscosity of 5235 centistokes at 30° C.

The polycondensate (I) is recoved in the form of a fine powder from the neutral polycondensate layer by spray-drying. The polycondensate (I) has a K value of 18 measured in a 1% solution in N-methylpyrrolidone at 25° C. and melts at 150° to 155° C. A sample of the product is melted for two hours at 220° to 230° C. while stirring and passing nitrogen over it. After this time the polycondensate (I) is still soluble and has a K value of 27.

EXAMPLE 2

Isophthalamide, N,N'-ethylenurea and formaldehyde in a molar ratio of 1:1:2.5 are condensed as described in Example 1. The neutralized layer containing the polycondensate is dreid in vacuo and a polycondensate is obtained which has a K value of 16.8 and a melting point of 150° to 155° C. When this is heated at 220° to 230° C., a melt is formed which slowly solidifies to a high melting point solid which is insoluble in N-methylpyrrolidine.

EXAMPLE 3

The componets specified in Example 2 are reacted in the molar ratio 1:1:4 according to the description in Example 1. No aqueous layer separates from the condensed mixture. A dried sample of the polycondensate is converted very rapidly by heating onto a solid substance which has a high melting point and is insoluble.

Similar results are obtained when using N,N'-propylenurea or a mixture of N,N-ethylenura and N,N'-propylenurea instead of N,N'-ethylenurea in Examples 1, 2 and 3.

EXAMPLE 4

5 parts by volume of a 10% sulfuric acid is added to 158 parts of a 38% aqueous solution of formaldehyde. Then while stirring well 86 parts of N,N'-ethylenurea and 144 parts of adipamide are introduced. The mixture is heated at 90° to 95° C. About ten minutes after this temperature has been reached, a clear solution is formed. A white pasty precipitate is formed after a condensation period of about forty-five minutes. A sample of the precipitate is soluble in a large amount of hot water. Water is added to the whole and neutralization is effected with caustic soda solution. The product is dried in vacuo. A polycondensate having a K value of 16.6 and which melts well is obtained in a yield of about 95%.

EXAMPLE 5

A sample of a granulate from a copolymer of trioxane (97%) and dioxolane (3%) (which has been melted in a degassing extruder with an addition of 0.02% of sodium fluoride and 0.25% of 2,2' - methylene - bis-(4-methyl-6-tertiary-butylphenol) and degassed) is extruded with 0.2% of polycondensate (I) from Example 1 from a screw extruder. The nitrogen content of the molding material determined for control of the stabilizer content is 0.032%. The loss in weight of samples of the stabilized molding materials after they have been heated for two hours at 222° C. is 0.5% if nitrogen has been passed over and 1.18% if air has been passed over.

Comparison Test A

Production of polycondensate for Comparison Test A: 1 mole of dihydroxymethylisophthalamide is mixed with a mole of N,N'-ethylenurea. The mixture is polycondensed by fusion under nitrogen at 230° to 235° C. The melt is allowed to cool and the polycondensate A is ground fine. The condensate powder melts at 215° to 225° C.

The procedure of Example 5 is followed but the polycondensate A prepared by melt condensation is used as stablizer instead of polycondensate (I). The nitrogen content of the molding material obtained is 0.034%; the loss in weight of stabilized samples after having been heated for two hours at 222° C. is 0.5 if nitrogen has been passed over and 1.5% if air has been passed over.

EXAMPLE 6

A polycondenate is prepared (as described for the production of the polycondensate (I) in Example 1) from adipamide (component A), N,N'-ethylenurea (component B) and formaldehyde (component C) in the molar ratio 1:1:2 (polycondensate (II)) and a polyacetal molding material which contains about 0.5% of the polycondensate (II) is prepared as described in Example 5. Tests reveal practically the same good stability values as are specified for the molding material in Example 5.

EXAMPLE 7

In the manner described in Example 5, molding materials are prepared from the trioxane copolymer therein described containing 0.02% of sodium fluoride and 0.25% of 2,2'methylene - bis-(4-methyl-6-tertiary-butylphenol) and different amounts of the polycondensate (I) specified therein. The relationship between stability of the samples of molding material obtained and their content of heat stabilizer (nitrogen content of the molding material) is shown in the following Table:

The following abbreviations are used in the Table:

Sample=sample of molding material

Nitrogen=percentage of nitrogen in the sample
N-loss=loss in weight under nitrogne after two hours at 222° C. in percent
Air-loss=loss in weight under air after two hours at 222° C. in percent

| Sample | Nitrogen | N-loss | Air-loss |
|---|---|---|---|
| 1 | 0.011 | 0.56 | 2.7 |
| 2 | 0.024 | 0.52 | 1.6 |
| 3 | 0.057 | 0.37 | 0.94 |
| 4 | 0.066 | 0.36 | 0.62 |
| 5 | 0.10 | 0.26 | 0.54 |
| 6 | *0 | 0.6–0.7 | 5–7 |

* Comparison.

All the samples are white (i.e. they do not show any discoloration) after a stability test consisting in heating the samples for two hours at 222° C. under nitrogen. In contrast to this, corresponding molding materials containing dicyanodiamide or a copolyamide as heat stabilizer are discolored yellow brown or brown after the same stability test.

EXAMPLE 8

A polycondensate is prepared from isophthalamide (component A), 4-methoxy-5,5-dimethyl-N,N'-propylenurea (component B) and aqueous formaldehyde (component C) in the molar ratio 1:1:2.6 in the manner described for the production of the polycondensate in Example 1. After 0.4% of this polycondensate has been incorporated into the polyacetal specified in Example 5, a molding material is obtained which exhibits a loss in weight of 0.9 to 1% in the specified stability test at 220° C. after two hours under air. Practically the same result is obtained when using a polycondensate of isophthalamide (component A), 4 - hydroxy - 5,5-dimethyl-6-isopropyl-N,N'-propyleneurea (component B) and formaldehyde (component C) in the molar ratio A:B:C=1:1:2.5.

We claim:

1. A moldable marcomolecular oxymethylene polymer having at least 80 mole percent recurring oxymethylene (—OCH$_2$) units in the main polymer chain, said polymer containing a stabilizing amount of a polycondensate obtained by condensing for 1–3 hours at 50 to 100° C. in an aqueous acid medium (A) isophthalic acid diamide, (B) a compound selected from the group consisting of N,N'-ethyleneurea and N,N'-propyleneurea in a molar ratio of (A) to (B) of from 0.7:1 to 1.3:1 and (C) formaldehyde in a molar ratio of (C) to the sum of the moles of (A) and (B) of from 1:1 to 1.5:1.

2. A composition as claimed in claim 1 said polycondensate having a K-value of about 15-20.

3. A composition as claimed in claim 1 the amount of said polycondensate being in the range of 0.5 to 5% by weight with reference to said oxymethylene polymer.

4. A composition as claimed in claim 3 said composition containing an additional stabilizing amount of an alkylene bisphenol having 1 to 4 carbon atoms in the alkylene group and having from 0 to 2 alkyl substitutents on each benzene ring, each alkyl substitutent having from 1 to 4 carbon atoms.

5. A composition as claimed in claim 1 said oxymethylene polymer being a copolymer of trioxane and one or more of ethylene oxide, propylene oxide, 1,3-dioxolane, 1,3-dioxane, 1,3-dioxacylocoheptane, diglycol formal or polyformal.

References Cited

UNITED STATES PATENTS

| 2,096,181 | 10/1937 | Jahrstorfer et al. | 260—72 |
| 3,063,960 | 11/1962 | Smith | 260—849 |
| 3,278,470 | 10/1966 | Henshall et al. | 260—849 |

OTHER REFERENCES

| 1,173,245 | 7/1961 | Germany. |
| 1,243,873 | 7/1967 | Germany. |
| 1,029,389 | 5/1966 | Great Britain. |

MURRAY TILLMAN, Primary Examiner

J. ZIEGLER, Assistant Examiner

U.S. Cl. X.R.

260—45.9 R, 45.9 S, 70 R, 72 R, 834, 901